Feb. 13, 1962 H. R. SUMMERHAYES, JR., ET AL 3,021,385
FLAME OBSERVATION SYSTEM
Filed March 30, 1960
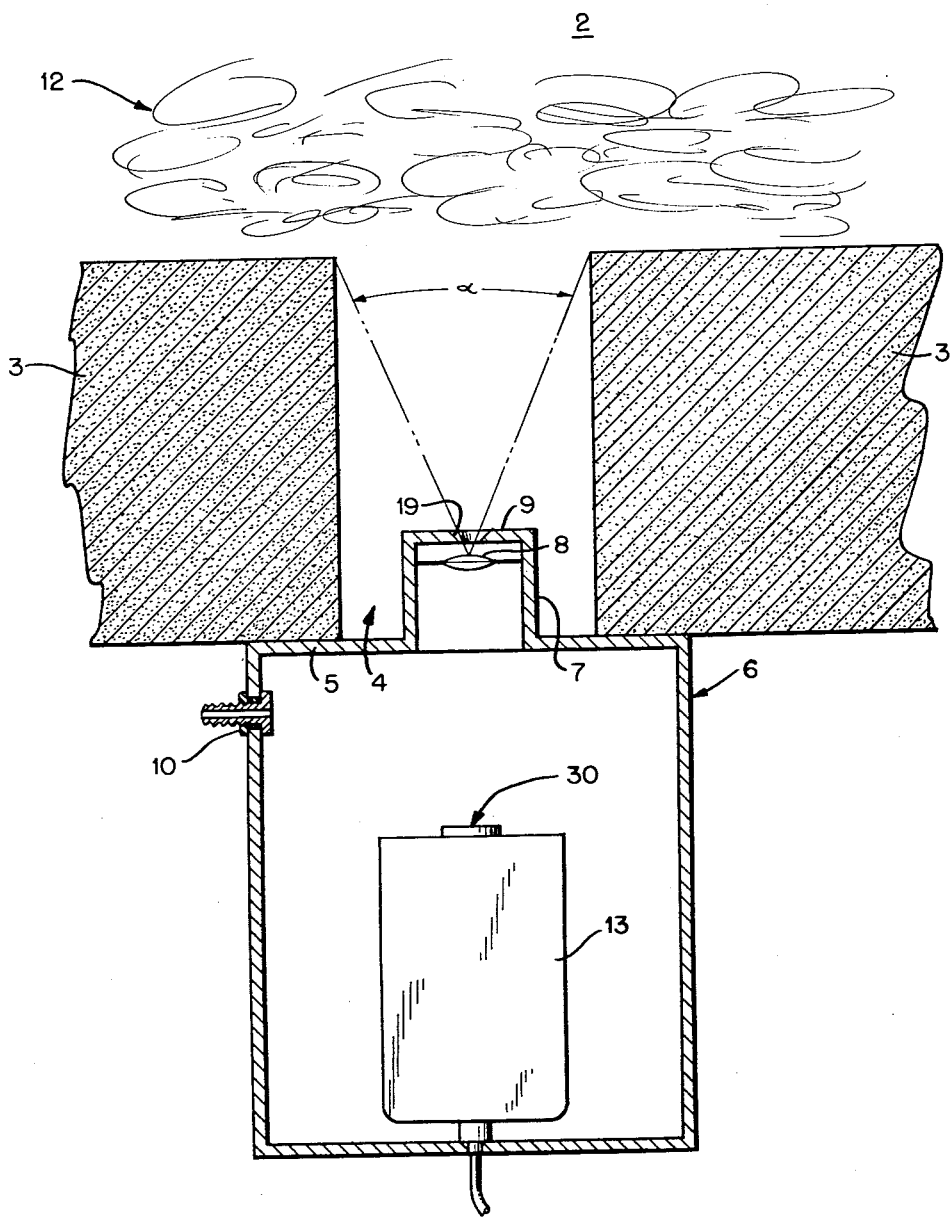
INVENTORS.
HARRY R. SUMMERHAYES, JR.
ERNEST S. SAMPSON
BY Joseph P. Kates
ATTORNEY

United States Patent Office 3,021,385
Patented Feb. 13, 1962

3,021,385
FLAME OBSERVATION SYSTEM
Harry R. Summerhayes, Jr., and Ernest S. Sampson, Schenectady, N.Y., assignors to General Electric Company, a corporation of New York
Filed Mar. 30, 1960, Ser. No. 18,699
7 Claims. (Cl. 178—6)

The present invention relates to a flame observation system and more particularly relates to apparatus enabling observation remotely in a closed circuit television system of the interior of an enclosure wherein hazardous conditions prevail such that direct viewing by a camera or by an observer is not feasible.

In the invention a camera for a closed circuit television system images the combustion process through a lens which is disposed closely behind a bevelled aperture in the solid front wall of a housing inserted in an aperture in the wall of an oven or boiler to view the flame.

The inserted housing covers and partially protrudes within the aperture in the wall of the combustion chamber. The lens forms an image of the inside of the combustion chamber on the face of the television camera tube. The housing containing the lens and having the aperture in its front face is maintained at a relatively high positive air pressure. This causes a high velocity air stream to flow out through the aperture and into the combustion chamber. The air stream prevents particles or smoke from entering the lens chamber and keeps the lens cool and clean.

Examples of prior art systems for viewing the interior of hazardous enclosures such as the interiors of boilers include the apparatus of Patent No. 2,157,413, issued May 9, 1939, to David J. Howard for Window for Stoves and that of Patent No. 2,850,005, issued September 2, 1958, to James A. Good and James C. Magestro for Observation Window.

In some prior art means air is passed over the viewing surface to prevent particles from pitting the surface or a window is inserted in a controlled ambient and mechanically cleaned or flushed with water. Despite these measures accumulation of dirt and condensate on the outside of the window or pitting of the window surface by high temperature particles occurred. The relatively large area of the viewing surface cannot be kept clean and protected effectively by prior art methods. Prior art solutions to overcome these deficiencies by inserting a perforate protective barrier between the transparent viewing device between the flame or other reaction of hazardous conditions to prevent the passage of relatively large soot, unburned fuel and flack particles, etc. from hitting the glass are unsuccessful because the smaller particles are not prevented from hitting the viewing surface and the collection of particles in the mesh or perforate barrier prevents viewing after such clogging and requires frequent changing of perforate barrier.

The present invention overcomes these and other disadvantages of prior art devices and provides structure such that only a relatively small portion of the viewing surface can possibly be hit by impinging particles. It provides a conical air barrier by means of a bevelled aperture in a solid wall which forms a conical path through which air under pressure is passed and then ejected. A relatively small transparent lens element face or portion thereof disposed closely behind the bevelled or chamferred aperture may be at the apex of the cone. The sides of the cone are formed from the bevelled shaped aperture in the solid wall. Thus, the invention provides protection of the viewing surface while enabling viewing over a relatively large angular (conical) area. The use of a lens close to the aperture allows a relatively large field of view to be observed through a small aperture. The small aperture allows a high velocity air stream to be used without requiring a large flow rate of air which might be expensive to produce or might interfere with the combustion process in the chamber.

The invention enables location of the television camera outside of the combustion chamber. It provides improved barrier protection and cooling of the optical surface of the lens which is located in proximity to heat and within the aperture in the wall of the combustion chamber. It provides for flow of air in a direction opposed to the direction of flying particles which might otherwise hit the optical surface so that the air barrier deflects all but larger heavier particles which large particles are prevented from hitting the lens because of the small size aperture.

A principal object of the present invention is to provide an improved means and method for viewing the interior of an enclosure such as a boiler from a remote point to determine reactive conditions, performance and/or action therein.

Another purpose of the present invention is to provide a means and a method enabling observation of a combustion chamber by a closed circuit television system which includes a solid plate extending into the enclosure housing the combustion chamber, the plate having a bevelled aperture with a lens closely spaced behind the aperture to form an image of the inside of the combustion chamber on the face of a television camera tube; a high velocity air stream flowing out through the aperture and into the combustion chamber to provide an air stream barrier to prevent particles or smoke from entering the lens chamber and also to keep the lens cool and clean.

Another aim of the present invention is to provide a system for observation of combustion chambers by closed circuit television which permits a relatively large field of view to be observed through a small aperture by a lens and enables a high velocity air stream to be used for cooling the lens and as a barrier against combustion product particles without requiring a large flow rate of air to thereby provide economy and not interfere with the combustion process in the chamber.

Another object of the present invention is to provide a means and a method of enabling observation of hazardous enclosures such as combustion chambers by closed circuit television apparatus for remote viewing which presents features of continuity of operation and viewing, safety of equipment, which enables a relatively large field of view to be observed, which combines operation economically and with noninterference with combustion processes and wherein oxide accumulation and condensation on the viewing lens is minimized.

Another aim of the present invention is to provide a system for continuous viewing of the interior of a hazardous internal condition device such as a boiler for display in a closed television circuit to an operator or other remote audience, which system has low initial cost, infrequent maintenance requirements, is readily installable, covers a wide angle of view, is economical in requiring a relatively small amount of air for cooling and protection of optical surfaces, which provides a clear picture despite relatively high ambient temperatures and wherein replacement of protective barrier parts is not necessary.

While the novel and distinctive features of the invention are particularly pointed out in the appended claims, a more expository treatment of the invention, in principle and in detail, together with additional objects and advantages thereof is afforded by the following description and accompanying drawing in which:

The figure is a schematic representation of an illustrative embodiment of the system of the present invention.

Now referring to the figure of the drawing an enclosure generally designated at 2 may comprise a walled combustion chamber in which a combustion process 12 or other hazardous reaction takes place. The enclosure 2 which may be a boiler or an oven, for example, may be enclosed by a wall 3. Wall 3 is apertured by aperture 4. Secured across the aperture 4 in enclosure 2 is the front wall 5 of a housing 6. Protruding forwardly of the front wall 5 of housing 6 into the aperture 4 of the boiler combustion chamber 2 is a lens housing portion or lens enclosing extension 7 of housing 6. Extension 7 may be substantially U-shaped in cross-sectional configuration, for example, to form a boss member which protrudes into aperture 4 and is of lesser width than the diameter of aperture 4.

Disposed in the front wall 9 of lens housing 8 is a bevelled or chamferred aperture 19. The bevel or chamfer of hole 19 is made to flange outwardly from the interior of lens housing 7 toward the aperture 4 and the combustion chamber 2 to provide an outwardly increasing angle or field of view α.

In the lens housing portion 7 of housing 6 may be disposed a lens 8. Lens 8 is disposed close (a small fraction of an inch) to the aperture 19 and therefore allows a relatively large field of view α to be observed through a small aperture. The outward angled bevel permits this view by removing otherwise possibly obstructing wall material of wall 9.

Compressed air input means 10 provides air flow into the chamber 6 and past the lens 8 through the aperture 19. Lens 8 is supported from housing 7 by supports (not numbered) of configuration to present no substantial barrier to air flow. A television camera 13 is disposed directly behind the lens 8 such that its camera tube will be disposed to receive an image of the combustion process from the lens member 8.

In operation lens 8 closely spaced behind small bevelled aperture 19 which aperture is in solid plate front wall 9 forms an image of the inside of the combustion chamber 2. The lens 8 views the combustion process 12 in combustion chamber 12 through aperture 4 in the wall of the combustion chamber. Television camera 13 is disposed axially aligned with and behind the lens 8 with the screen 30 of the television tube disposed in the image plane of the lens. An image of the inside of the combustion chamber 2 is formed on the face of the television camera tube (not numbered) of television camera 13. The housing 7 of enclosure 6 containing the lens and having small aperture 19 in its front wall 9 is then maintained at a relatively high positive air pressure from compressed air input 10 so that a high velocity air stream flows out through the aperture 19 and into the combustion chamber 2. This high velocity outgoing jet acts as a barrier to prevent particles and smoke from entering the lens chamber and keeps the lens plate cool and clean.

The disposition of lens 8 close to aperture 19 allows a relatively large field of view to be observed through small aperture 19. The small size of aperture 19 allows a high velocity air stream without requiring a large flow rate of air which is expensive to produce and might interfere with the combustion process in the chamber.

Although nowise to be considered as limiting the invention thereby one embodiment of the invention employs the following dimensions:

Aperture 19 is one quarter inch in diameter. The aperture in boiler wall 4 is four inches in diameter. The length of the front wall 9 is over three inches and the lens 8 is set back approximately one eighth of an inch from the inner face of wall 9. The air pressure is three pounds per square inch. In a test of this equipment the exit velocity of air was estimated to be 1500 to 2000 feet per minute and the total air flow was estimated to be less than one cubic foot per minute. No oxide accumulation in the test box nor condensation on the lens occurs over a relatively long period of time with this configuration.

Instead of the separate housing 6, in cases where a thin combustion chamber wall exists the bevelled aperture could be cut into the wall itself and the lens supported behind it.

While a specific embodiment of the invention has been shown and described, it should be recognized that the invention should not be limited thereto. It is accordingly intended in the appended claims to claim all such variations as fall within the true spirit of the invention.

What is claimed is:

1. In combination an enclosure which houses a reaction process, means for televising the reaction process for remote display of said process and means to convey optically an image of said reaction process to said television means, said enclosure being apertured, a lens and a protective housing enclosing said lens, said protective housing being of configuration and disposed to protrude into said enclosure aperture and extend partly within said enclosure, said televising means being connected in said housing opposite said enclosure protruding end, and in alignment with and behind said lens such that it can pick up images in the image plane of said lens, said housing having a relatively small diameter aperture through its front face portion protruding into said enclosure to expose the interior of said enclosure to the face of said lens, said lens being in alignment with and in proximity to the aperture in said housing, means to supply compressed air connected to said housing, said air flowing into said housing past said lens and being ejected through said aperture to cool said lens and act as a barrier to protect the lens face from particles from the reaction striking the lens.

2. The apparatus of claim 1 wherein said aperture is bevelled outwardly in a direction towards the interior of said enclosure to thereby provide a relatively large and uninterrupted field of view for said lens.

3. The apparatus of claim 2 wherein said housing comprises a reduced portion containing said aperture in its front wall and an enlarged portion, such enlarged portion having a front wall bearing against the outer wall of said reaction process housing enclosure to thereby seal the enclosure aperture, said smaller portion protruding into the aperture in said enclosure housing, said lens being supported in said smaller portion and being spaced from said reduced portion front wall aperture a distance of the order of one quarter inch.

4. In combination a walled chamber in which a combustion process occurs, a relatively small diameter viewing aperture disposed in a wall of said chamber, a lens housing disposed to seal said viewing aperture, said chamber wall aperture being of relatively small diameter, a lens disposed adjacent and behind said chamber wall aperture, a television camera tube having its image responsive means disposed substantially at the image plane of said lens, a compressed air input supply, said compressed air upon entering said housing flowing through said chamber wall aperture to act as a barrier against combustion particles ejected from said combustion chamber toward said lens and to cool the face of said lens, said chamber wall aperture being bevelled to thereby provide an increased field of view from the lens to the interior of said combustion chamber.

5. In combination with a combustion chamber having a wall in which is disposed a relatively small chamber viewing aperture, a housing member protruding into said chamber viewing aperture in said combustion chamber, said housing having an apertured front wall, said housing front wall aperture being bevelled and of relatively small diameter in comparison with the length of said housing front wall, a lens disposed in said housing in proximity to and axially aligned behind said aperture, a television camera disposed in the image plane of said lens to project images of the interior of said chamber to a closed circuit television system, and compressed air input means to enable flowing of compressed air past said lens and through said aperture.

6. A combustion chamber having a viewing port, a viewing system for observation of said combustion chamber, said system comprising a closed circuit television system including a television camera having a television camera tube, a lens disposed in axial alignment with said television camera tube and located a distance appropriate to form the image from the lens on the camera tube face, whereby images from said lens are televised by said television camera, a housing enclosing said lens and said camera, compressed air input means to provide compressed air to said housing, said housing being of dimensions larger than said camera and said lens to thereby provide a plenum chamber therebetween between the walls of the housing and the enclosed lens and camera, said housing having a front wall, said front wall being apertured, said front wall aperture being chamferred, said lens being disposed directly behind and closely adjacent to said aperture, said aperture being of relatively small diameter of the order of one quarter inch, said front wall being of the order of about three inches, the front portion of said housing containing said front wall and said lens being inserted in said viewing port of said combustion chamber, said lens viewing the interior of said combustion chamber through said housing aperture to image the combustion chamber interior scene on the face of the camera tube, said compressed air flowing past said lens through said lens housing aperture to cool said lens and present a protective air barrier for said lens.

7. A combustion chamber having an aperture through its wall, a cover member including an extension housing protruding within said chamber wall aperture, said extension housing being apertured at its forward end, said housing aperture being chamfered, a lens disposed in proximity to said forward end and axially aligned behind said aperture, an image receiving instrument disposed to view the image from said lens of the scene within the combustion chamber viewed by said lens through said extension housing aperture, and means to provide air flow past said lens and through said extension housing aperture to cool and clean said aperture being of diameter of the order to permit a jet stream of air to act as a barrier to smaller combustion chamber flying matter directed toward said housing aperture and to form a barrier for larger combustion chamber flying particles.

References Cited in the file of this patent

"Closed-Circuit Television Systems," RCA Service Co., copyright 1958, see Addenda, pp. 13 through 18.

"TV in Power Stations," from "Mechanical Engineering," December 1951, pp. 1008 and 1009.